(12) United States Patent
Kojima

(10) Patent No.: US 8,370,771 B2
(45) Date of Patent: Feb. 5, 2013

(54) COMMUNICATION DEVICE

(75) Inventor: Naosato Kojima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 310 days.

(21) Appl. No.: 12/726,590

(22) Filed: Mar. 18, 2010

(65) Prior Publication Data

US 2010/0241995 A1  Sep. 23, 2010

(30) Foreign Application Priority Data

Mar. 23, 2009 (JP) ................... 2009-070942

(51) Int. Cl.
*G06F 3/048* (2006.01)
(52) U.S. Cl. ...................................... 715/840
(58) Field of Classification Search .................... 715/840
See application file for complete search history.

(56) References Cited

U.S. PATENT DOCUMENTS

| | | | | |
|---|---|---|---|---|
| 6,100,890 A * | 8/2000 | Bates et al. | ................ | 715/826 |
| 6,295,355 B1 * | 9/2001 | O'Neal et al. | ........... | 379/355.05 |
| 6,760,431 B1 * | 7/2004 | Haimi-Cohen | .......... | 379/355.01 |
| 2002/0133564 A1 * | 9/2002 | Takayama | ................ | 709/217 |
| 2003/0158860 A1 * | 8/2003 | Caughey | ................ | 707/200 |
| 2004/0119755 A1 * | 6/2004 | Guibourge | ................ | 345/827 |
| 2004/0267625 A1 * | 12/2004 | Feng et al. | ................ | 705/26 |
| 2005/0069124 A1 * | 3/2005 | Isozaki | ................ | 379/355.02 |
| 2005/0175169 A1 * | 8/2005 | Boda | ................ | 379/355.01 |
| 2005/0195446 A1 * | 9/2005 | Kasatani | ................ | 358/402 |
| 2005/0198180 A1 * | 9/2005 | Khanolkar et al. | ........... | 709/206 |
| 2005/0219640 A1 * | 10/2005 | Kasatani | ................ | 358/402 |
| 2006/0080284 A1 * | 4/2006 | Masonis et al. | ................ | 707/3 |
| 2006/0089987 A1 * | 4/2006 | Igarashi et al. | ................ | 709/225 |
| 2007/0288575 A1 * | 12/2007 | Gillum et al. | ................ | 709/206 |
| 2008/0004080 A1 * | 1/2008 | Li et al. | ................ | 455/564 |
| 2009/0271407 A1 * | 10/2009 | Hawkins et al. | ................ | 707/6 |
| 2009/0282117 A1 * | 11/2009 | Numata | ................ | 709/206 |
| 2010/0029326 A1 * | 2/2010 | Bergstrom et al. | ......... | 455/556.1 |
| 2010/0064012 A1 * | 3/2010 | Cruse, Jr. | ................ | 709/206 |
| 2010/0121631 A1 * | 5/2010 | Bonnet et al. | ................ | 704/9 |
| 2011/0225254 A1 * | 9/2011 | Atkins et al. | ................ | 709/206 |

FOREIGN PATENT DOCUMENTS

| | | |
|---|---|---|
| JP | 08-102783 A | 4/1996 |
| JP | 11-187105 A | 7/1999 |
| JP | 2000-224288 | 8/2000 |
| JP | 2002-344686 A | 11/2002 |

* cited by examiner

*Primary Examiner* — Tuyetlien Tran
(74) *Attorney, Agent, or Firm* — Kubotera & Associates, LLC

(57) ABSTRACT

A communication device for sending data to a destination includes a destination storage unit for registering the destination; a condition input unit for inputting a registration condition to register the destination in the destination storage unit and a deletion condition to delete the destination registered in the destination storage unit; a condition storage unit for the registration condition and the deletion condition input through the condition input unit; a destination registration unit for storing the destination in the destination storage unit when the destination satisfies the registration condition stored in the condition storage unit; and a destination deletion unit for deleting the destination satisfying the registration condition stored in the condition storage unit and stored in the destination storage unit when the destination satisfies the deletion condition stored in the condition storage unit.

11 Claims, 13 Drawing Sheets

COMMUNICATION DEVICE

BACKGROUND OF THE INVENTION AND RELATED ART STATEMENT

The present invention relates to a communication device such as a multi function product and the like. More specifically, the present invention relates to a communication device capable of communicating with a destination.

When a telephone number of a destination is frequently input in a conventional communication device, the conventional communication device stores the number of the inputs of the telephone number. When the number of the inputs reaches a specific number, the conventional communication device registers the telephone number as a one-touch dial number or an abbreviated number, thereby making the one-touch dial number or the abbreviated number available (refer to Patent Reference).

Patent Reference: Japanese Patent Publication No. 2000-224288

In the conventional communication device described above, when the number of the destinations to be registered in an address book as the one-touch dial numbers or the abbreviated numbers increases, it is necessary to delete destinations with less frequent usage from the address book.

When the destination is deleted, it is necessary to determine a usage frequency of the destination, thereby making an administrative operation of the conventional communication device complicated.

In view of the problems described above, an object of the present invention is to provide a communication device capable of solving the problems of the conventional communication device. In the communication device of the present invention, it is possible to delete destinations with less frequent usage from an address book without making an administrative operation complicated.

Further objects and advantages of the invention will be apparent from the following description of the invention.

SUMMARY OF THE INVENTION

In order to attain the objects described above, according to the present invention, a communication device for sending data to a destination includes a destination storage unit for registering the destination; a condition input unit for inputting a registration condition to register the destination in the destination storage unit and a deletion condition to delete the destination registered in the destination storage unit; a condition storage unit for storing the registration condition and the deletion condition input through the condition input unit; a destination registration unit for storing the destination in the destination storage unit when the destination satisfies the registration condition stored in the condition storage unit; and a destination deletion unit for deleting the destination satisfying the registration condition stored in the condition storage unit and stored in the destination storage unit when the destination satisfies the deletion condition stored in the condition storage unit.

In the communication device of the present invention, it is possible to delete the destination with less frequent usage from an address book without making an administrative operation complicated.

DETAILED DESCRIPTION OF PREFERRED EMBODIMENTS

Hereunder, embodiments of the present invention will be explained with reference to the accompanying drawings.

First Embodiment

Figure 1:
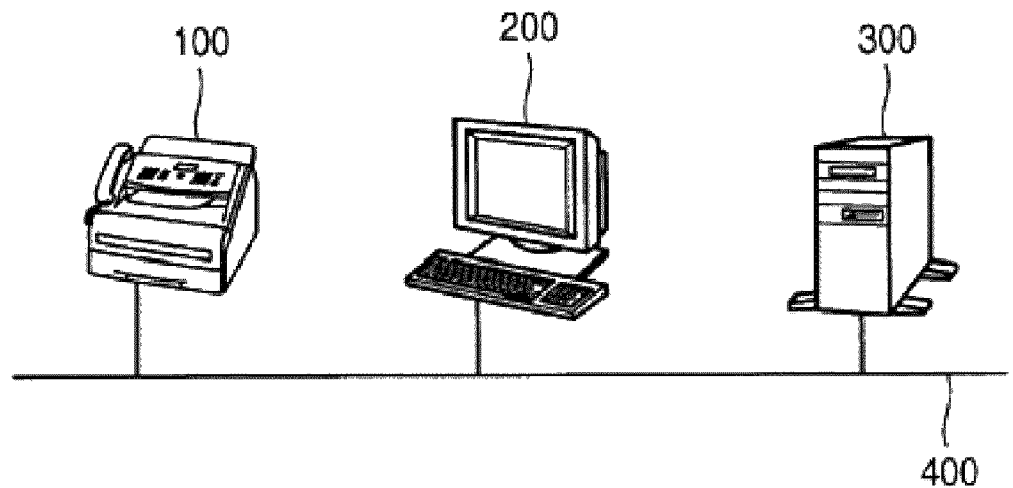
FIG. 1 is a schematic view showing a configuration of a system according to a first embodiment of the present invention.

A first embodiment of the present invention will be explained. FIG. 1 is a schematic view showing a configuration of a system according to the first embodiment of the present invention.

As shown in FIG. 1, a multi function product 100 (referred to as an MFP 100) as a communication device is connected to a personal computer 200 (referred to as a PC 200) as a client computer and a mail server 300 through an LAN (Local Area Network) 400 as a communication network. Accordingly, the MFP 100 is capable of communicating with the PC 200 and the mail server 300.

In the embodiment, the MFP 100 reads an image of an original with an image reading unit 104 thereof. Then, the MFP 100 sends image data of the original thus read and the like in an electric mail format to the mail server 300 through the LAN 400. The PC 200 receives the electric mail sent thereto and stored in the mail server 300 through the LAN 400.

Figure 2:
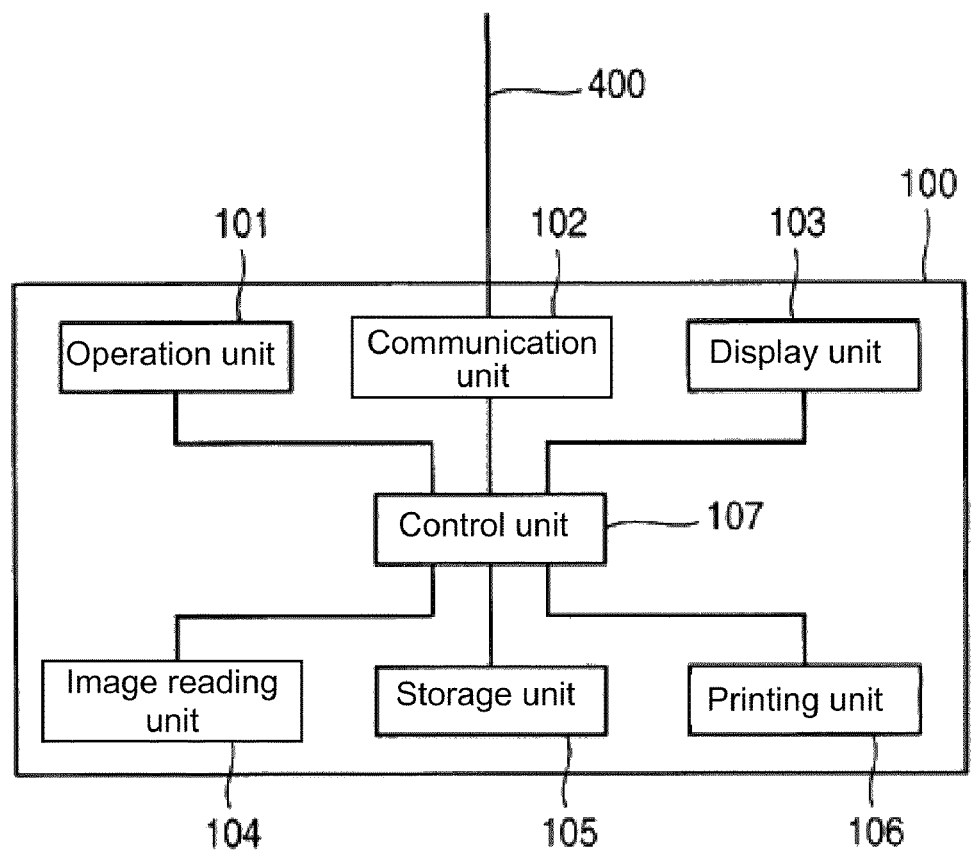
FIG. 2 is a block diagram showing a configuration of a multi function product according to the first embodiment of the present invention.

FIG. 2 is a block diagram showing a configuration of the multi function product 100 according to the first embodiment of the present invention. As shown in FIG. 2, the MFP 100 includes an operation unit 101, a communication unit 102, a display unit 103, the image reading unit 104, a storage unit 105, a printing unit 106, and a control unit 107.

In the embodiment, the operation unit 101 is formed of a touch panel and an operation button for receiving an input operation of an operator. More specifically, the operation unit 101 receives an operation for inputting a destination as a transmission destination of the electric mail, an operation of setting auto registration of the destination, an operation of instructing transmission of the electric mail, and the like.

In the embodiment, the communication unit 102 controls the transmission and reception of information between the MFP 100 and the personal computer 200 and the mail server 300 through the LAN 400.

In the embodiment, the display unit 103 is formed of a liquid crystal display and the like for displaying a text and a graphic. More specifically, the display unit 103 displays a setting screen of the automatic registration and the like. The display unit 103 is disposed on the operation unit 101, so that the operation unit 101 functions as an operation display unit for displaying a text and receiving an input from the operator.

In the embodiment, the image reading unit 104 is a scanner for reading an original. More specifically, the image reading unit 104 scans the original to read information of the original such as a text and a graphic.

In the embodiment, the storage unit 105 is formed of a memory and the like for storing image information of the original read with the image reading unit 104 and setting information of the automatic registration input through the operation unit 101. Further, the storage unit 105 stores a transmission history in which the image information of the original read with the image reading unit 104 is transmitted to the mail server 300. Further, the storage unit 105 stores a destination address book and registration instruction information 900 (refer to FIG. 8) corresponding to the destination of the transmission history.

In the embodiment, the storage unit 105 stores the destination address book, in which a destination satisfying a specific registration condition is stored to simplify an input operation of the destination through the operation unit 101. More specifically, the operator operates the operation unit 101 to retrieve the destination registered in the storage unit 105 to display the destination on the display unit 103. Accordingly, it is possible to select and input the destination thus displayed. Further, the storage unit 105 stores a control program (software) for controlling an entire operation of the MFP 100.

In the embodiment, the printing unit 106 receives the image information of the original stored in the storage unit 105 as a print job, thereby performing a printing operation.

In the embodiment, the control unit 107 is connected to the operation unit 101, the communication unit 102, the display unit 103, the image reading unit 104, the storage unit 105, and the printing unit 106 through signal lines. The control unit 107 as a control portion and a calculation portion controls the entire operation of the MFP 100 according to the control program stored in the storage unit 105. Further, the control unit 107 includes a timing unit having a calendar function and a timing function.

Figure 3:
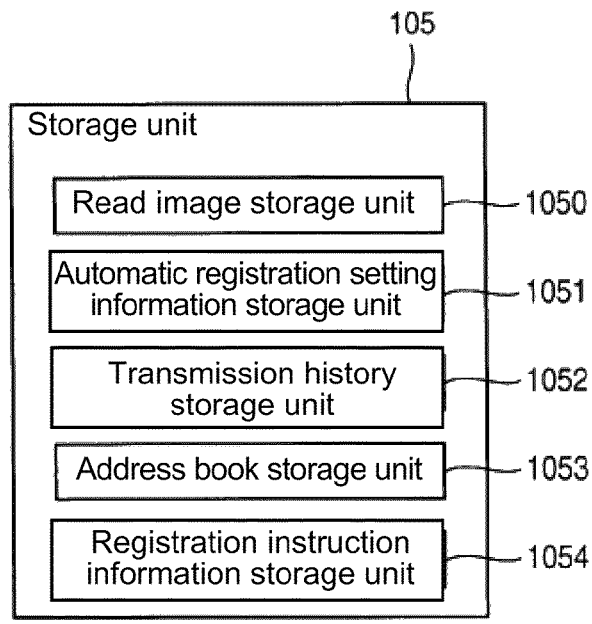
FIG. 3 is a block diagram showing a configuration of a storage unit of the multi function product according to the first embodiment of the present invention.

FIG. 3 is a block diagram showing a configuration of the storage unit 105 of the multi function product 100 according to the first embodiment of the present invention. As shown in FIG. 3, the storage unit 105 includes a read image storage unit 1050, an automatic registration setting information storage unit 1051, a transmission history storage unit 1052, an address book storage unit 1053, and a registration instruction information storage unit 1054.

In the embodiment, the read image storage unit 1050 stores the image information of the original read with the image reading unit 104. The automatic registration setting information storage unit 1051 as a condition storage unit stores the setting information of the automatic registration input through the operation unit 101. More specifically, the automatic registration setting information storage unit 1051 stores a registration condition to register the destination such as an electric mail address of the transmission destination in the destination address book, and a deletion condition to delete the destination registered in the destination address book.

In the embodiment, the transmission history storage unit 1052 stores a history such as date, time, the transmission destination, and the like as the transmission history when the image information of the original read with the image reading unit 104 is transmitted to the mail server 300. The address book storage unit 1053 as a destination storage unit stores the destination in the destination address book such as the electric mail address of the transmission destination to which the electric mail is transmitted.

Figure 8:
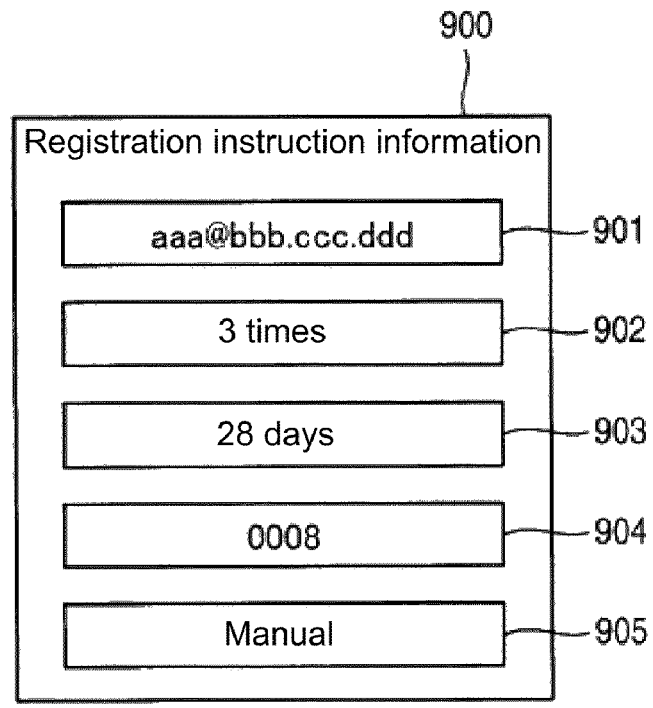
FIG. 8 is a schematic view showing a configuration of registration instruction information of the multi function product according to the first embodiment of the present invention.

In the embodiment, the registration instruction information storage unit 1054 stores the registration instruction information 900 (refer to FIG. 8). The registration instruction information 900 is provided for registering the destination such as the electric mail address of the transmission destination in the destination address book, and for deleting the destination registered in the destination address book (described later).

Figure 4:
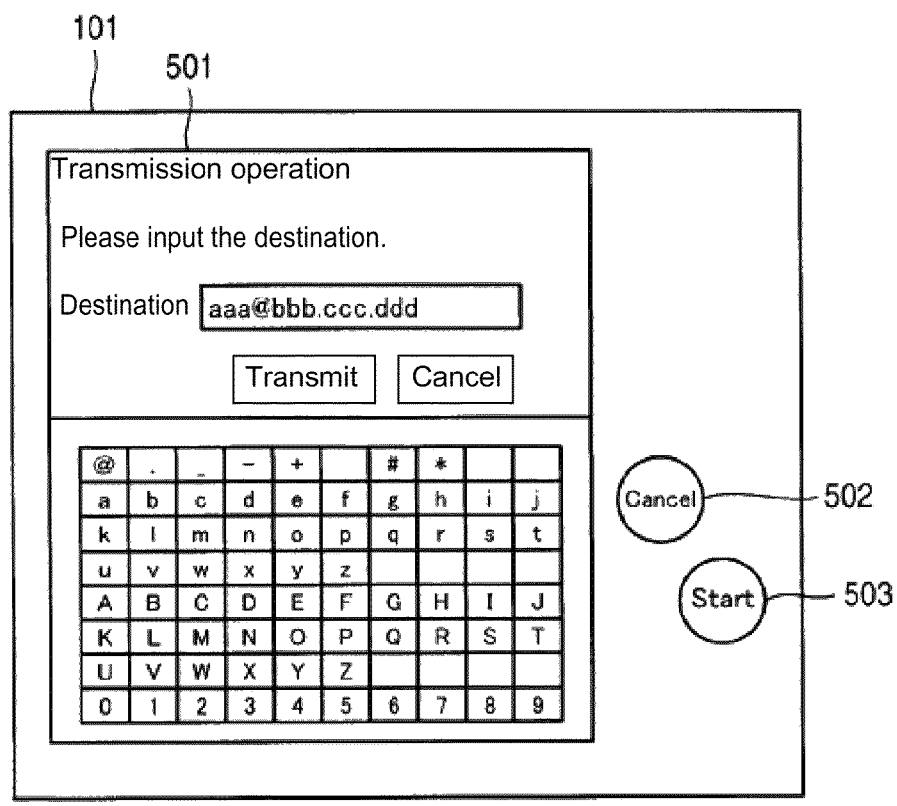
FIG. 4 is a schematic view showing a display operation panel of the multi function product in a transmission operation according to the first embodiment of the present invention.

FIG. 4 is a schematic view showing a display operation panel 501 of the multi function product 100 in a transmission operation according to the first embodiment of the present invention.

As shown in FIG. 4, the operation unit 101 includes the display operation panel 501 for displaying a registration instruction setting screen and a list of characters, numbers, and symbols to be selected upon inputting the destination and the like; a cancel button 502 for receiving an operation of cancelling the transmission operation; and a start button 503 for receiving an operation for executing the transmission operation.

In the embodiment, the display operation panel 501 is formed of a touch panel capable of performing the input operation. The multi function product 100 is configured such that the display operation panel 501 displays an automatic registration setting screen 800 shown in FIG. 7 (described later), so that an instruction setting of the automatic registration is input.

Figure 5:
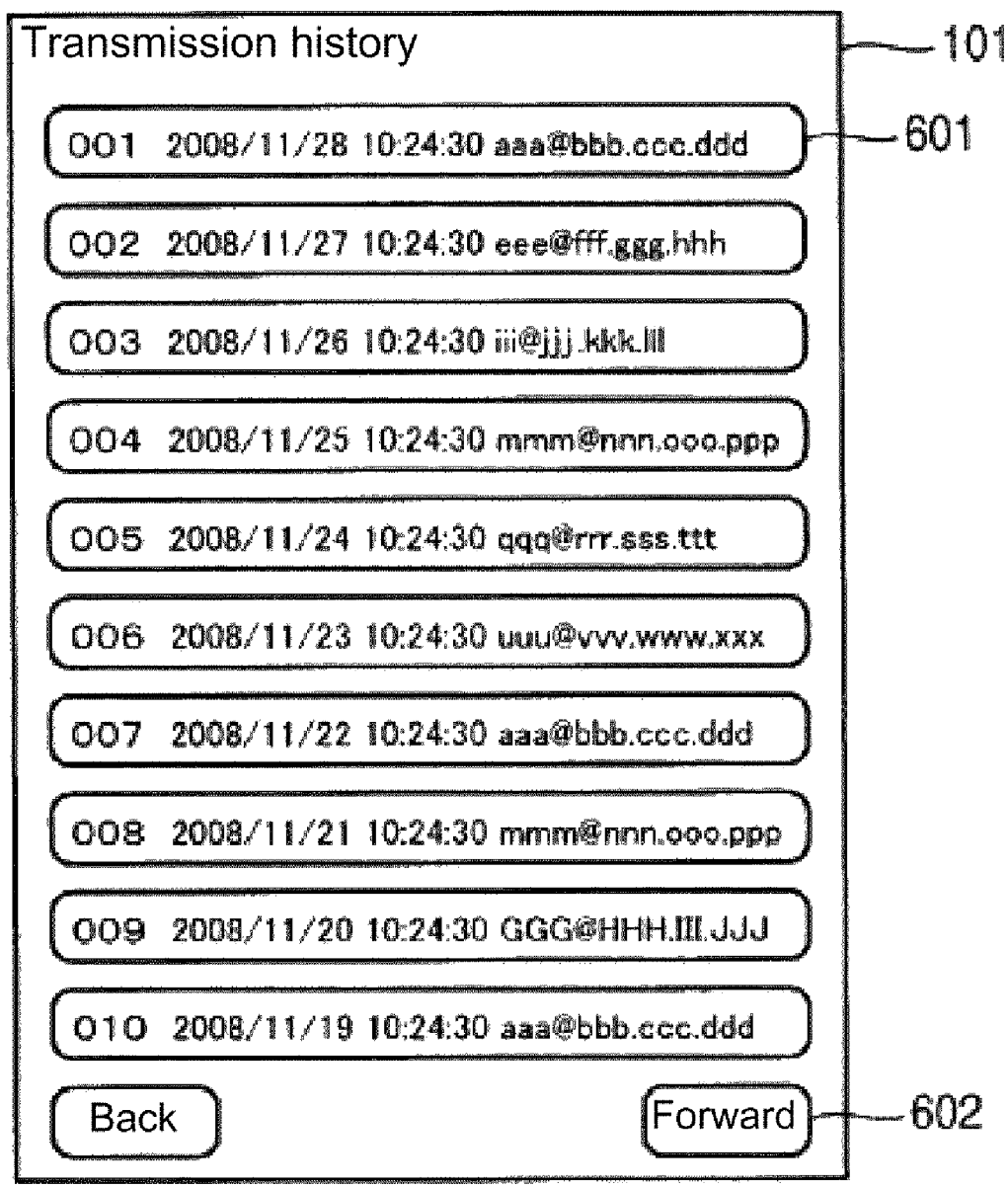
FIG. 5 is a schematic view showing a transmission history of the multi function product according to the first embodiment of the present invention.

FIG. 5 is a schematic view showing a transmission history 601 of the multi function product 100 according to the first embodiment of the present invention. In FIG. 5, as an example, the transmission history 601 includes the date, the time, and the transmission destination stored in the transmission history storage unit 1052, and is displayed on the operation unit 101 as transmission history information More specifically, in the transmission history 601, a year, a month, a date, an hour, a minute, and a second when the electric mail is transmitted are displayed and arranged in a time-sequence. Further, the electric mail addresses are displayed and arranged in the time-sequence as the transmission destinations. It is possible to display the transmission history 601 not displayed yet through pushing operation buttons 602, i.e., a forward button and a back button. When the transmission history 601 thus displayed is selected and pushed, it is possible to set the destination of the transmission history 601 thus selected as the destination to be used upon transmission.

Figure 6:
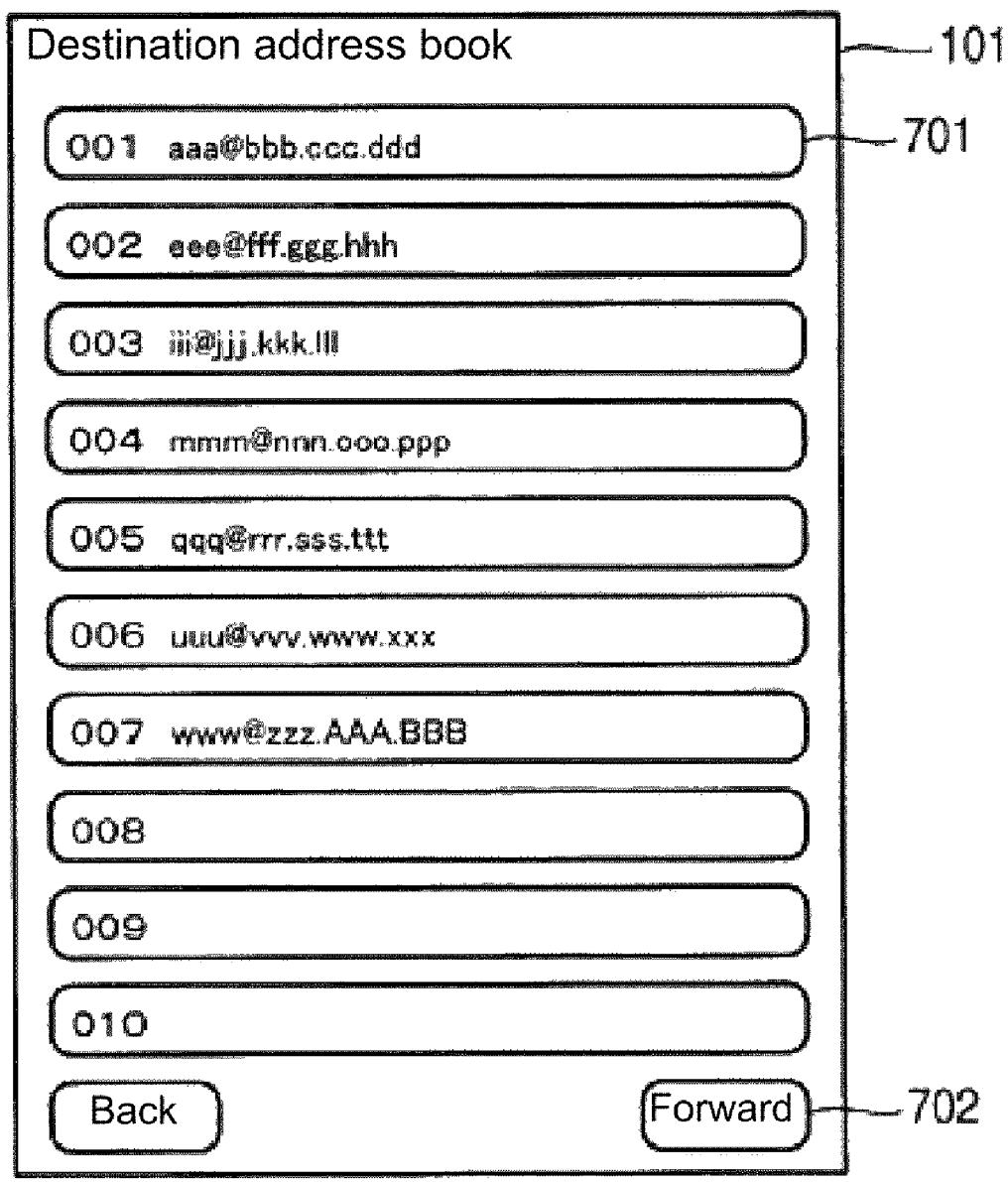
FIG. 6 is a schematic view showing a destination address book of the multi function product according to the first embodiment of the present invention.

FIG. 6 is a schematic view showing the destination address book of the multi function product 100 according to the first embodiment of the present invention. In FIG. 6, as an example, a destination 701 stored in the address book storage unit 1053 is displayed on the operation unit 101. The destination address book is formed of one destination 701 or a plurality of the destinations 701.

As shown in FIG. 6, the destinations 701 are arranged and displayed in an alphabetical sequence or a register number sequence with the electric mail addresses of the transmission destinations as the destinations. It is possible to display the destination 701 not displayed yet through pushing operation buttons 702, i.e., a forward button and a back button. When the destination 701 thus displayed is selected and pushed, it is possible to set the destination 701 thus selected as the destination to be used upon transmission.

Figure 7:
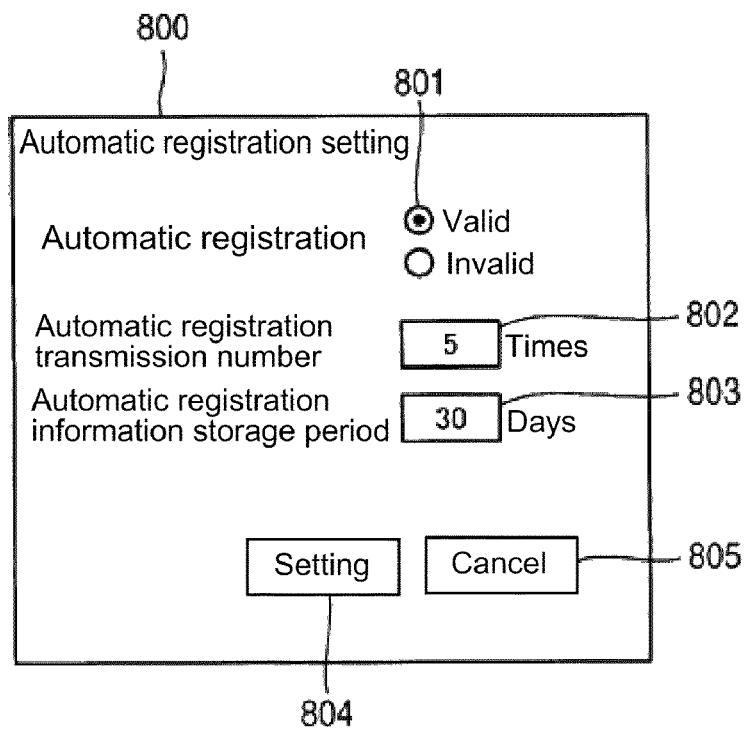
FIG. 7 is a schematic view showing an automatic registration setting screen of the multi function product according to the first embodiment of the present invention.

FIG. 7 is a schematic view showing the automatic registration setting screen 800 of the multi function product 100 according to the first embodiment of the present invention.

In the automatic registration setting screen 800 shown in FIG. 7, it is possible to set the registration condition for the automatic registration of the destination, and the deletion condition for the automatic deletion of the destination. When the automatic registration setting is instructed through the input operation using the display operation panel 501 described above, the automatic registration setting screen 800 is displayed on the operation unit 101 as a condition input unit.

As shown in FIG. 7, the automatic registration setting screen 800 includes an automatic registration valid/invalid 801, an automatic registration transmission number 802, an automatic registration information storage period 803, a setting operation button 804, and a cancel button 805.

In the embodiment, the automatic registration valid/invalid 801 is provided for selecting whether the automatic registration of the destination is set to be valid or invalid. The automatic registration transmission number 802 is provided for setting a transmission number (a first threshold value) of the automatic registration of the destination when the automatic registration valid/invalid 801 selects that the automatic registration of the destination is set to be valid.

In the embodiment, when the transmission number of the electric mail per destination reaches the transmission number set with the automatic registration transmission number 802, an unused registration number is assigned to the destination, so that the destination is registered in the destination address book. When the registration number is assigned to the destination, the control unit 107 as a destination registration unit registers the registration number in the destination address book. Further, the registration number is displayed as the destination 701 shown in FIG. 6.

In the embodiment, the automatic registration information storage period 803 is provided for setting a storage period (a second threshold value, for example, the number of days) during which the destination thus registered is stored in the address book storage unit 1053 when the automatic registration valid/invalid 801 selects that the automatic registration of the destination is set to be valid. The storage period starts counting when a last transmission is conducted. After the storage period is elapsed, the control unit 107 as a destination deletion unit deletes the destination thus registered from the address book storage unit 1053. Accordingly, the automatic registration information storage period 803 corresponds to the deletion condition for deleting the destination thus registered from the destination address book.

In the embodiment, the setting operation button 804 is provided for storing the settings input through the automatic registration valid/invalid 801, the automatic registration transmission number 802, and the automatic registration information storage period 803 in the automatic registration setting information storage unit 1051. The cancel button 805 is provided for cancelling the automatic registration of the destination.

FIG. 8 is a schematic view showing a configuration of the registration instruction information 900 of the multi function product 100 according to the first embodiment of the present invention.

As shown in FIG. 8, the registration instruction information 900 includes a destination 901, a transmission number 902, a no-transmission period 903, a registration number 904, and a manual registration flag 905. As described above, the registration instruction information 900 is stored in the registration instruction information storage unit 1054 while correlating with the destination 901.

In the embodiment, the electric mail address of the transmission destination is stored as the destination in the destination 901. The number of transmissions relative to the destination 901 is stored in the transmission number 902. A period (the number of days) since the last transmission relative to the destination 901 is stored in the no-transmission period 903.

In the embodiment, when the transmission number 902 reaches the automatic registration transmission number 802, the registration number to be assigned for the registration in the destination address book is stored in the registration number 904. The registration number 904 is initialized with "NULL", and stays "NULL" until the registration operation is performed. After the registration number is assigned in the registration number 904, the destination 901 is stored in the address book storage unit 1053 of the storage unit 105.

In the embodiment, the registration number 904 stores information as a flag indicating the destination 901 is not automatically registered, and is rather manually registered through an operation of the operator. When the registration number 904 is set, the registration instruction information 900, that is, the destination 901, is not automatically deleted from the destination address book.

In the embodiment, as described above, the automatic registration of the destination is set first. After the transmission of the electric mail to the destination thus set is repeated for a specific number of times, the registration number is assigned to the destination, and the destination is registered in the destination address book. Afterward, when the no-transmission period relative to the destination thus registered is elapsed and exceeds the automatic registration information storage period, the registration instruction information of the destination is deleted.

An operation of the MFP 100 will be explained next. First, the operator operates the operation unit 101 of the MFP 100 to set the automatic registration valid/invalid 801, the automatic registration transmission number 802, and the automatic registration information storage period 803 in the automatic registration setting screen 800 displayed on the display unit 103 as shown in FIG. 7. In the following description, it is supposed that the automatic registration valid/invalid 801 selects that the automatic registration of the destination is set to be valid; a specific number (for example, five times) is set in the automatic registration transmission number 802; and a specific period (for example, 30 days) is set in the automatic registration information storage period 803.

Figure 9:
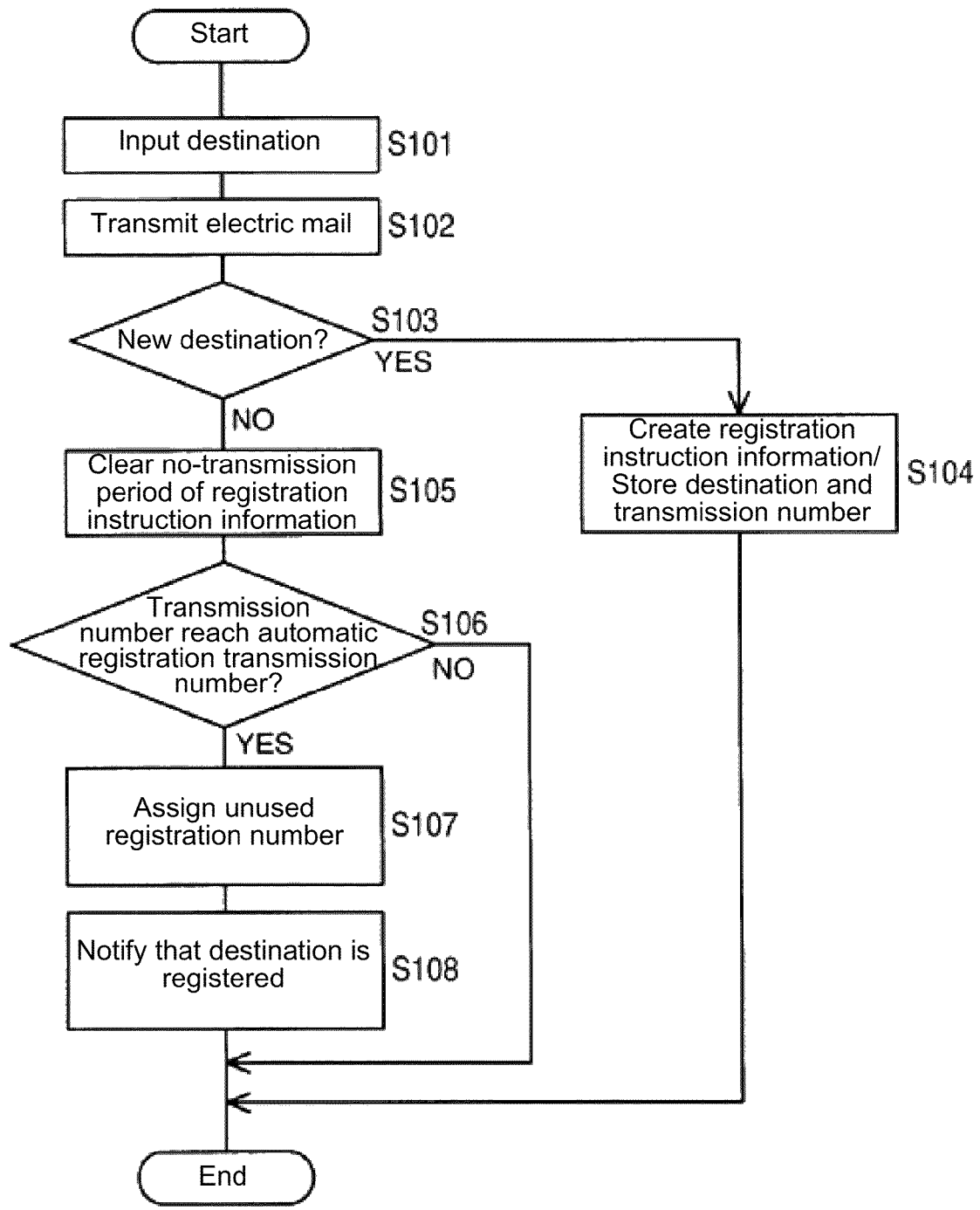
FIG. 9 is a flow chart showing an automatic registration operation of the multi function product according to the first embodiment of the present invention.

The automatic registration operation of the destination from when the operator starts operating the operation unit 101 to when the transmission is conducted will be explained next with reference to a flow chart shown in FIG. 9. FIG. 9 is a flow chart showing the automatic registration operation of the multi function product 100 according to the first embodiment of the present invention.

In step S101, the operator operates the display operation panel 501 shown in FIG. 4 to input the destination to the operation unit 101 of the MFP 100. In step S102, the operator pushes the start button 503 of the operation unit 101 shown in FIG. 4, so that the control unit 107 transmits the electric mail to the destination thus input.

In step S103, after the control unit 107 transmits the electric mail, the control unit 107 determines whether the destination is a new destination. When the control unit 107 determines that the destination is the new destination, the process proceeds to step S104. When the control unit 107 determines that the destination is not the new destination, the process proceeds to step S105.

In step S104, when the control unit 107 determines that the destination is the new destination, the control unit 107 newly creates the registration instruction information 900 shown in FIG. 8. Further, the control unit 107 stores the destination 901 and the transmission number 902 (one time) in the registration instruction information storage unit 1054, thereby completing the process.

In step S105, when the control unit 107 determines that the destination is not the new destination, the control unit 107 clears the no-transmission period 903 of the registration instruction information 900 of the destination as zero (zero day).

In step S106, the control unit 107 adds one to the no-transmission period 903 of the registration instruction information 900 of the destination. Then, the control unit 107 determines whether the transmission number relative to the destination reaches the automatic registration transmission number 802 stored in the automatic registration setting information storage unit 1051. When the control unit 107 determines that the transmission number relative to the destination reaches the automatic registration transmission number 802, the process proceeds to step S107. When the control unit 107 determines that the transmission number relative to the destination does not reach the automatic registration transmission number 802, the process is completed.

In step S107, when the transmission number relative to the destination reaches the automatic registration transmission number 802, the control unit 107 assigns and stores an unused registration number in the registration number 904 of the registration instruction information 900 of the destination. Further, the control unit 107 stores and registers the destination in the address book storage unit 1053. Accordingly, the destination is registered in the address book storage unit 1053 as the destination address book, and is displayed in the destination address book shown in FIG. 6.

In step S108, the control unit 107 displays a notice that the destination is registered on the display unit 103, so that the operator is notified that the destination is registered. Through the steps described above, the MFP 100 performs the automatic registration operation of the destination.

Figure 10:
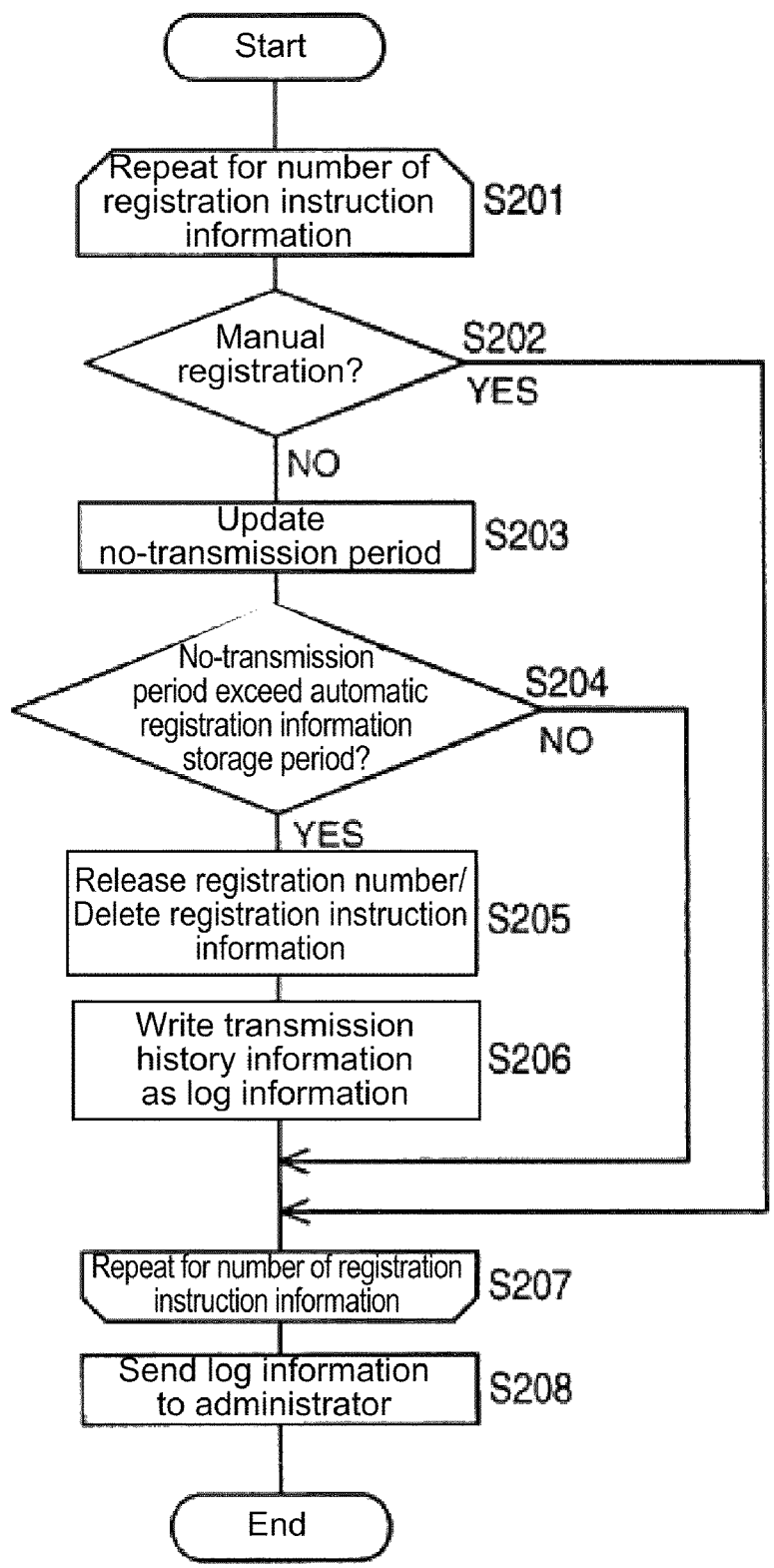
FIG. 10 is a flow chart showing an automatic deletion operation of the multi function product according to the first embodiment of the present invention.

The automatic deletion operation of the multi function product 100, in which the registration information of the destination is automatically deleted, will be explained next with reference to FIG. 10. FIG. 10 is a flow chart showing the automatic deletion operation of the multi function product 100 according to the first embodiment of the present invention. It is supposed that the automatic deletion operation is performed as a batch process per specific period of time such as once a day or once a week.

In step S201, the process from step S202 to step S206 is repeated for the number of the registration instruction information 900.

In step S202, the control unit 107 of the MFP 100 retrieves the registration instruction information 900 shown in FIG. 8 and stored per destination from the registration instruction information storage unit 1054. Then, the control unit 107 determines whether the manual registration flag 905 of the registration instruction information 900 thus retrieved indicates the manual registration. When the control unit 107 determines that the manual registration flag 905 indicates the manual registration, the process proceeds to step S207. When the control unit 107 determines that the manual registration flag 905 does not indicate the manual registration, the process proceeds to step S203.

In step S203, when the control unit 107 determines that the manual registration flag 905 does not indicate the manual registration, that is, the registration instruction information 900 is automatically registered or the registration instruction information 900 is not registered and not assigned with the registration number, the control unit 107 updates the no-transmission period 903 of the registration instruction information 900.

In step S204, the control unit 107 determines whether the no-transmission period 903 thus updated exceeds the automatic registration information storage period 803 stored in the automatic registration setting information storage unit 1051. When the control unit 107 determines that the no-transmission period 903 does not exceed the automatic registration information storage period 803, the process proceeds to step S207. When the control unit 107 determines that the no-transmission period 903 exceeds the automatic registration information storage period 803, the process proceeds to step S205.

In step S205, when the control unit 107 determines that the no-transmission period 903 exceeds the automatic registration information storage period 803, the control unit 107 releases the registration number 904 assigned to the destination 901, and deletes the registration instruction information 900 from the registration instruction information storage unit 1054. Further, the control unit 107 deletes the destination from the address book storage unit 1053, and deletes the transmission history information relative to the destination from the transmission history storage unit 1052.

In step S206, the control unit 107 writes the transmission history information deleted from the transmission history storage unit 1052 as log information to the storage unit 105.

In step S207, the process from step S201 to step S206 is repeated for the number of the registration instruction information 900 stored in the registration instruction information storage unit 1054, thereby processing all the registration instruction information 900. In step S208, the control unit 107 sends the transmission history information written to the storage unit 105 as the log information to an administrator of the MFP 100. Through the steps described above, the MFP 100 performs the automatic deletion operation.

As described above, when the control unit 107 of the MFP 100 determines that the no-transmission period 903 relative to the destination exceeds the automatic registration information storage period 803 set in advance, the control unit 107 deletes the destination from the destination address book. Accordingly, it is possible to delete the destination with less frequent usage from the destination address book without making an administrative operation of the destination address book complicated.

As described above, in the embodiment, when the control unit 107 of the MFP 100 determines that the no-transmission period 903 relative to the destination exceeds the automatic registration information storage period 803 set in advance, the control unit 107 deletes the destination from the destination address book. Accordingly, it is possible to delete the destination with less frequent usage from the destination address book without making an administrative operation of the destination address book complicated.

Second Embodiment

A second embodiment of the present invention will be explained next. In the second embodiment, a multi function product (MFP) 1000 has a configuration different from that of the MFP 100 in the first embodiment. Components in the second embodiment similar to those in the first embodiment are designated with the same reference numerals, and explanations thereof are omitted.

Figure 11:
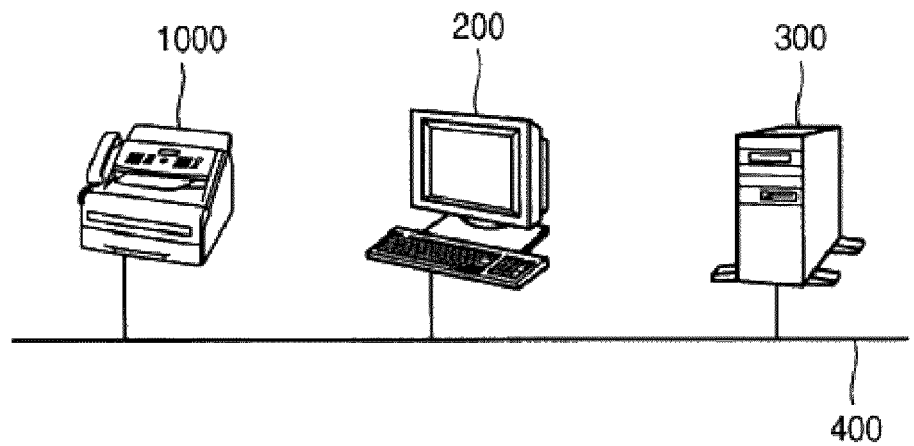
FIG. 11 is a schematic view showing a configuration of a system according to a second embodiment of the present invention.

FIG. 11 is a schematic view showing a configuration of a system according to the second embodiment of the present invention.

As shown in FIG. 11, the MFP 1000 as a communication device is connected to the personal computer 200 (referred to as a PC 200) as the client computer and the mail server 300 through the LAN (Local Area Network) 400 as the communication network. Accordingly, the MFP 1000 is capable of communicating with the PC 200 and the mail server 300.

In the embodiment, the MFP 1000 reads an image of an original with an image reading unit thereof. Then, the MFP 1000 sends image data of the original thus read and the like in an electric mail format to the mail server 300 through the LAN 400. The PC 200 receives the electric mail sent thereto and stored in the mail server 300 through the LAN 400.

Figure 12:
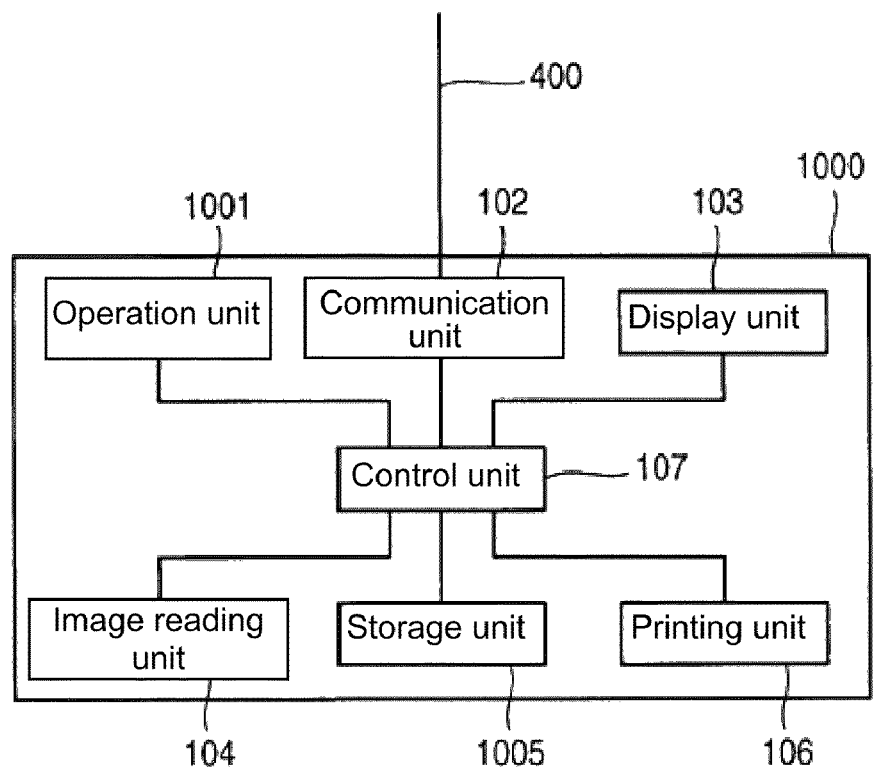
FIG. 12 is a block diagram showing a configuration of a multi function product according to the second embodiment of the present invention.

FIG. 12 is a block diagram showing a configuration of the multi function product 1000 according to the second embodiment of the present invention.

As shown in FIG. 2, the MFP 1000 includes an operation unit 1001, the communication unit 102, the display unit 103, the image reading unit 104, a storage unit 1005, the printing unit 106, and the control unit 107.

In the embodiment, the operation unit 1001 is formed of a touch panel and an operation button for receiving an input operation of an operator. More specifically, the operation unit 1001 receives an operation of inputting a destination as a transmission destination of an electric mail, an operation of setting auto registration of a destination, an operation of instructing transmission, and the like.

In the embodiment, the display unit 103 is disposed on the operation unit 1001, so that the operation unit 1001 functions as an operation display unit for displaying a text and receiving an operation of the operator.

In the embodiment, the storage unit 1005 is formed of a memory and the like for storing image information of the original read with the image reading unit 104, setting information of the automatic registration input through the operation unit 1001, and setting information of the one-touch registration input through the operation unit 1001. Further, the storage unit 1005 stores a transmission history in which the image information of the original read with the image reading unit 104 is transmitted to the mail server 300. Further, the storage unit 1005 stores a destination address book, one-touch registration information, and registration instruction information 1300 (refer to FIG. 16) corresponding to the destination of the transmission history.

In the one-touch registration, the destination is registered, so that the destination is displayed on the operation unit 1001 prior to the destination address book and can be selected with a simple operation. Further, the storage unit 1005 stores a control program (software) for controlling an entire operation of the MFP 1000.

In the embodiment, the control unit 107 is connected to the operation unit 1001, the communication unit 102, the display unit 103, the image reading unit 104, the storage unit 1005, and the printing unit 106 through signal lines. The control unit 107 as the control portion and the calculation portion controls the entire operation of the MFP 1000 according to the control program stored in the storage unit 1005. Further, the control unit 107 includes the timing unit having the calendar function and the timing function.

Figure 13:
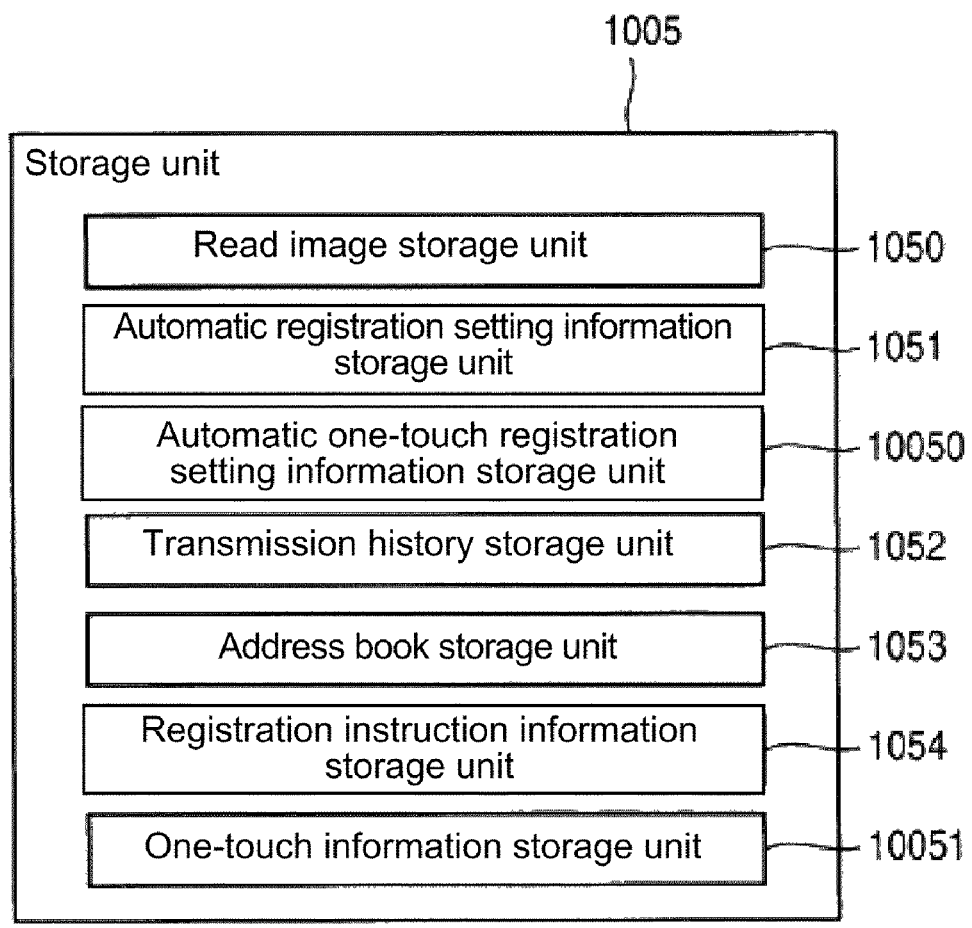
FIG. 13 is a block diagram showing a configuration of a storage unit of the multi function product according to the second embodiment of the present invention.

FIG. 13 is a block diagram showing a configuration of the storage unit 1005 of the multi function product 1000 according to the second embodiment of the present invention. As shown in FIG. 13, the storage unit 1005 includes the read image storage unit 1050, the automatic registration setting information storage unit 1051, an automatic one-touch registration setting information storage unit 10050, the transmission history storage unit 1052, the address book storage unit 1053, the registration instruction information storage unit 1054, and a one-touch information storage unit 10051.

In the embodiment, the automatic one-touch registration setting information storage unit 10050 as a priority selection registration information storage unit stores the setting information of the automatic one-touch registration input through the operation unit 1001. More specifically, the automatic one-touch registration setting information storage unit 10050 stores a registration condition to register the destination such as an electric mail address of a transmission destination in the one-touch registration, and a deletion condition to delete the destination registered in the one-touch registration. The one-touch information storage unit 10051 stores the destination registered in the one-touch registration as one-touch registration information.

Figure 14:
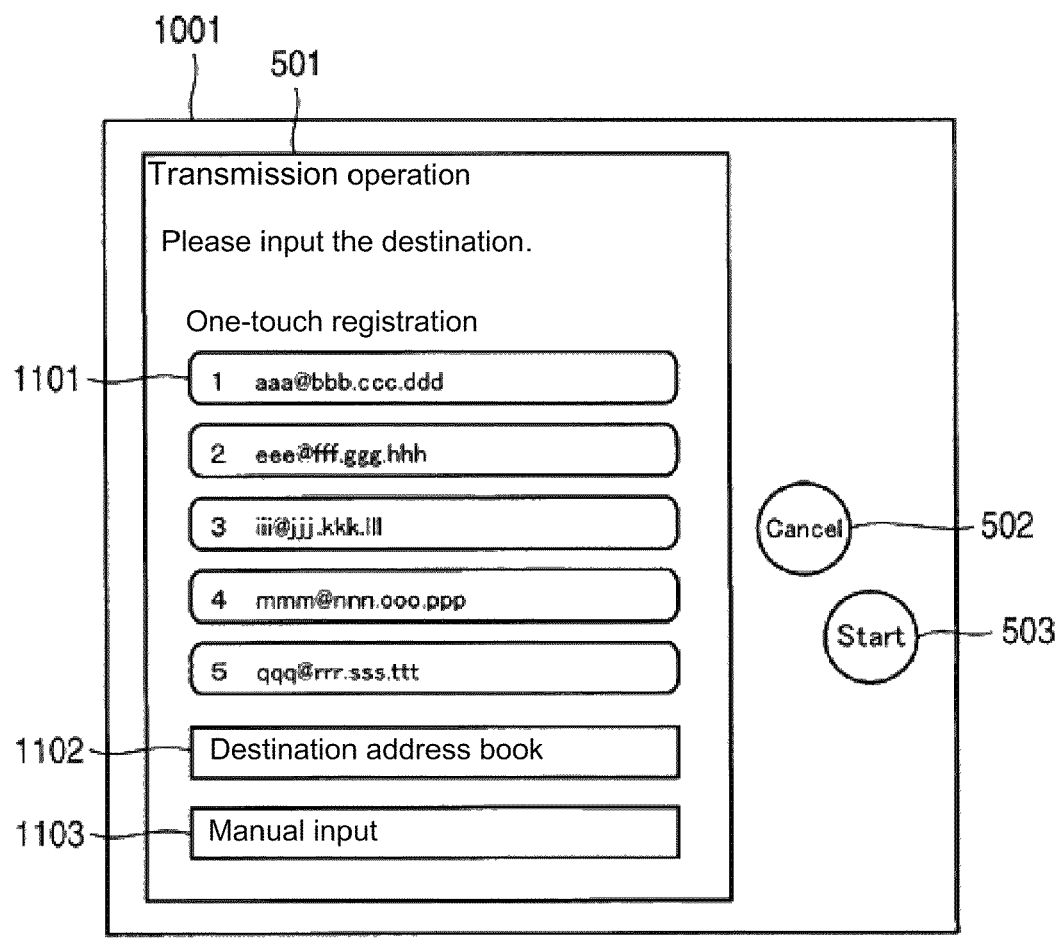
FIG. 14 is a schematic view showing a display operation panel of the multi function product in a transmission operation according to the second embodiment of the present invention.

FIG. 14 is a schematic view showing the display operation panel 501 of the multi function product 1000 in a transmission operation according to the second embodiment of the present invention.

As shown in FIG. 14, the operation unit 1001 includes the display operation panel 501 formed of one-touch buttons 1101 corresponding to each destination, an address book input button 1102 for displaying the destination registered in the destination address book, and a manual input button 1103 for displaying a manual input screen.

In the embodiment, after one of the one-touch buttons 1101 is selected and pushed, when the start button 503 is pushed, it is possible to transmit to the destination corresponding to the one of the one-touch buttons 1101. Accordingly, it is possible to display the one-touch buttons 1101 prior to the destination address book, thereby making it possible to select the destination through the simple operation. When the manual input button 1103 is pushed, the display operation panel 501 shown in FIG. 4 is displayed.

Figure 15:
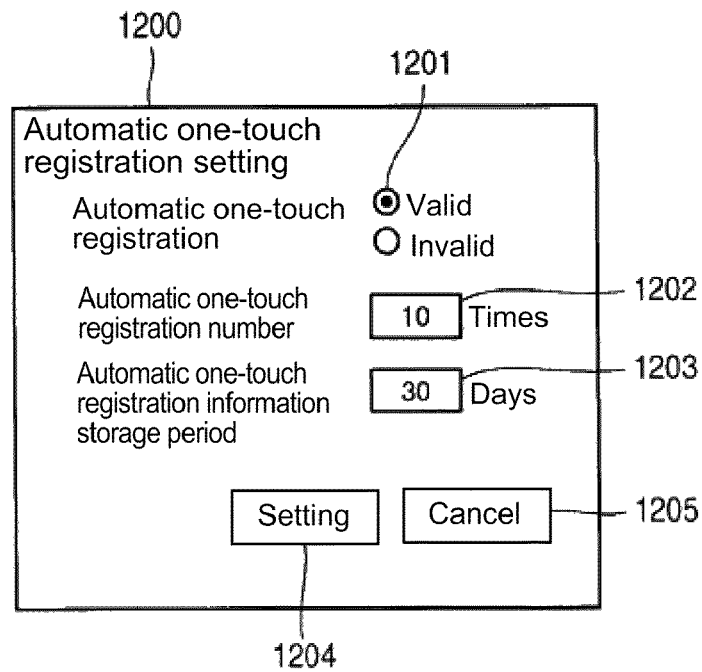
FIG. 15 is a schematic view showing an automatic one-touch registration setting screen of the multi function product according to the second embodiment of the present invention.

FIG. 15 is a schematic view showing an automatic one-touch registration setting screen 1200 of the multi function product 1000 according to the second embodiment of the present invention.

In the automatic one-touch registration setting screen 1200 shown in FIG. 15, it is possible to set the registration condition for the automatic one-touch registration of the destination, and the deletion condition for deleting the destination. When the automatic one-touch registration setting is instructed through the input operation using the display operation panel 501 described above, the automatic one-touch registration setting screen 1200 is displayed on the operation unit 1001 as a priority selection registration instruction input unit.

As shown in FIG. 15, the automatic one-touch registration setting screen 1200 includes an automatic one-touch registration valid/invalid 1201, an automatic one-touch registration number 1202, an automatic one-touch registration information storage period 1203, a setting operation button 1204, and a cancel button 1205.

In the embodiment, the automatic one-touch registration valid/invalid 1201 is provided for selecting whether the automatic one-touch registration of the destination is set to be valid or invalid. The automatic one-touch registration number 1202 is provided for setting a transmission number (a third threshold value) of the automatic one-touch registration of the destination when the automatic one-touch registration valid/invalid 1201 selects that the automatic one-touch registration of the destination is set to be valid.

In the embodiment, when the transmission number of the electric mail per destination reaches the transmission number set with the automatic one-touch registration number 1202, an unused one-touch registration number is assigned to the destination, so that the destination is registered in the one-touch registration information. When the one-touch registration number is assigned to the destination, the control unit 107 as a priority selection destination registration unit registers the registration number in the one-touch registration information. Further, the destination is displayed as one of the one-touch buttons 1101 shown in FIG. 14.

In the embodiment, the automatic one-touch registration information storage period 1203 is provided for setting a storage period (a fourth threshold value, for example, the number of days) during which the destination thus registered is stored in the one-touch information storage unit 10051 when the automatic one-touch registration valid/invalid 1201 selects that the automatic one-touch registration of the destination is set to be valid. The storage period starts counting when a last transmission is conducted. After the storage period (the fourth threshold value) is elapsed, the control unit 107 as a priority selection destination deletion unit deletes the destination thus registered from the one-touch information storage unit 10051. Accordingly, the automatic one-touch registration information storage period 1203 corresponds to the deletion condition for deleting the destination thus registered from the one-touch registration information.

In the embodiment, the setting operation button 1204 is provided for storing the settings input through the automatic one-touch registration valid/invalid 1201, the automatic one-touch registration number 1202, and the automatic one-touch registration information storage period 1203 in the automatic one-touch registration setting information storage unit 10050. The cancel button 1205 is provided for cancelling the automatic one-touch registration of the destination.

Figure 16:
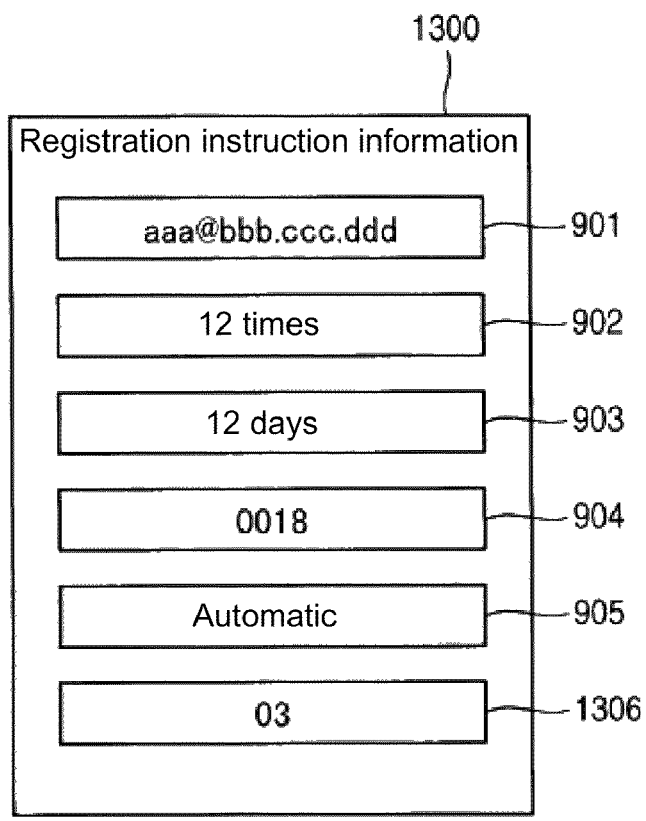
FIG. 16 is a schematic view showing a configuration of registration instruction information of the multi function product according to the second embodiment of the present invention.

FIG. 16 is a schematic view showing a configuration of the registration instruction information 1300 of the multi function product 1000 according to the second embodiment of the present invention.

As shown in FIG. 16, the registration instruction information 1300 includes the destination 901, the transmission number 902, the no-transmission period 903, the registration number 904, the manual registration flag 905, and a one-touch registration number 1306. As described above, the registration instruction information 1300 is stored in the registration instruction information storage unit 1054 while correlating with the destination 901.

In the embodiment, when the transmission number 902 reaches the automatic one-touch registration number 1202, the one-touch registration number to be assigned for the one-touch registration in the one-touch registration information is stored in the one-touch registration number 1306. The one-touch registration number 1306 is initialized with "NULL", and stays "NULL" until the one-touch registration operation is performed.

In the second embodiment, the MFP 1000 has a function of the automatic one-touch registration in addition to the function of the MFP 100 in the first embodiment. In the automatic one-touch registration, when the setting conditions are satisfied, the destination used in the transmission is automatically assigned to one of the one-touch buttons 1101. Further, when the no-transmission period 903 exceeds the automatic one-touch registration information storage period 1203, the one-touch registration information of the destination is automatically deleted.

In the second embodiment, as described above, in addition to the operation in the first embodiment, the automatic one-touch registration of the destination is set first. After the transmission of the electric mail to the destination thus set is repeated for a specific number of times, the one-touch registration number is assigned to the destination, and the destination is registered in the one-touch registration information. Afterward, when the no-transmission period 903 relative to the destination thus registered is elapsed and exceeds the automatic one-touch registration information storage period 1203, the one-touch registration information of the destination is deleted.

An operation of the MFP 1000 will be explained next. First, the operator operates the operation unit 1001 of the MFP 1000 to set the automatic one-touch registration valid/invalid 1201, the automatic one-touch registration number 1202, and the automatic one-touch registration information storage period 1203 in the automatic one-touch registration setting screen 1200 displayed on the display unit 103 as shown in FIG. 15. In the following description, it is supposed that the automatic one-touch registration valid/invalid 1201 selects that the automatic one-touch registration of the destination is set to be valid; a specific number (for example, ten times) is set in the automatic one-touch registration number 1202; and a specific period (for example, 30 days) is set in the automatic one-touch registration information storage period 1203.

Figure 17:
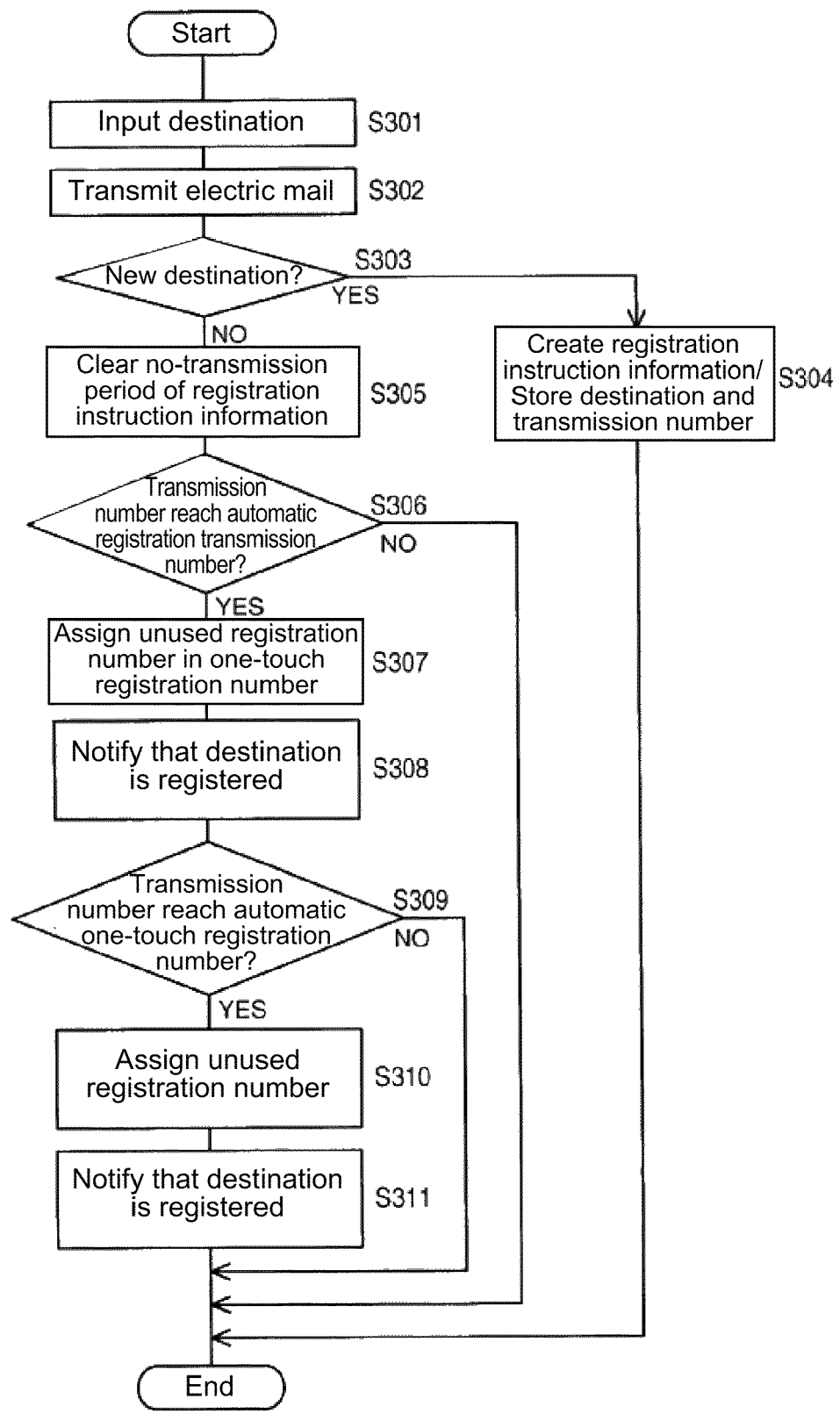
FIG. 17 is a flow chart showing an automatic registration operation of the multi function product according to the second embodiment of the present invention.

The automatic registration operation of the destination from when the operator starts operating the operation unit 1001 to when the transmission is conducted will be explained next with reference to a flow chart shown in FIG. 17. FIG. 17 is the flow chart showing the automatic registration operation of the multi function product 1000 according to the second embodiment of the present invention.

In the embodiment, the process from step S301 to step S308 is similar to that from step S101 to step S108 shown in FIG. 9, and an explanation thereof is omitted.

In step S309, the control unit 107 determines whether the transmission number relative to the destination reaches the automatic one-touch registration number 1202 stored in the automatic one-touch registration setting information storage unit 10050. When the control unit 107 determines that the transmission number relative to the destination reaches the automatic one-touch registration number 1202, the process proceeds to step S310. When the control unit 107 determines that the transmission number relative to the destination does not reach the automatic one-touch registration number 1202, the process is completed.

In step S310, when the transmission number relative to the destination reaches the automatic one-touch registration number 1202, the control unit 107 assigns and stores an unused registration number in the one-touch registration number 1306 of the registration instruction information 1300 of the destination. Further, the control unit 107 stores and registers the destination in the one-touch information storage unit 10051. Accordingly, the destination is registered in the one-touch information storage unit 10051 as the one-touch destination, and is displayed in one of the one-touch buttons 1101 shown in FIG. 14.

In step S311, the control unit 107 displays a notice that the destination is registered as the one-touch destination on the display unit 103, so that the operator is notified that the destination is registered as the one-touch destination. Through the steps described above, the MFP 1000 performs the automatic one-touch registration operation of the destination.

Figure 18:
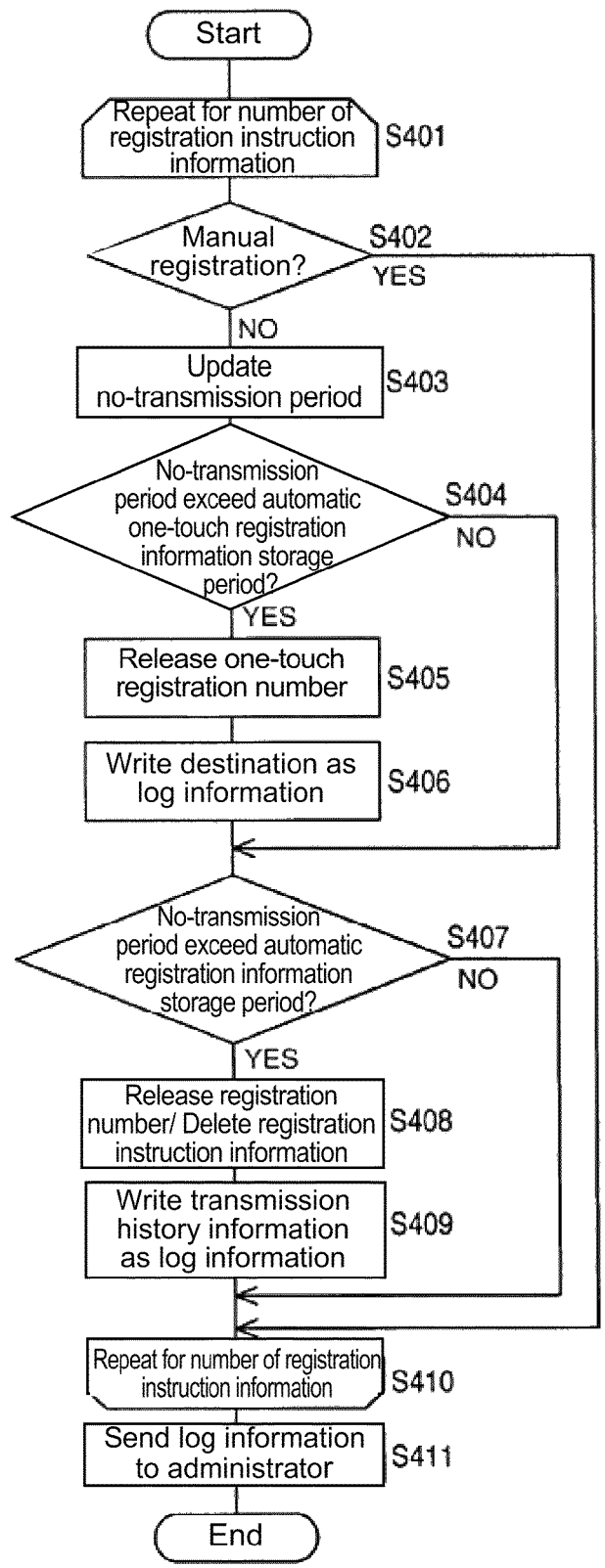
FIG. 18 is a flow chart showing an automatic deletion operation of the multi function product according to the second embodiment of the present invention.

The automatic deletion operation of the multi function product 1000, in which the one-touch registration information of the destination is automatically deleted, will be explained next with reference to FIG. 18. FIG. 18 is a flow chart showing the automatic deletion operation of the multi function product 1000 according to the second embodiment of the present invention. It is supposed that the automatic deletion operation is performed as a batch process per specific period of time such as once a day or once a week.

In step S401, the process from step S402 to step S409 is repeated for the number of the registration instruction information. The process from step S402 to step S403 is similar to that from step S202 to step S203 shown in FIG. 10, and an explanation thereof is omitted.

In step S404, the control unit 107 determines whether the no-transmission period 903 thus updated exceeds the automatic one-touch registration information storage period 1203 stored in the automatic one-touch registration setting information storage unit 10050. When the control unit 107 determines that the no-transmission period 903 does not exceed the automatic one-touch registration information storage period 1203, the process proceeds to step S407. When the control unit 107 determines that the no-transmission period 903 exceeds the automatic one-touch registration information storage period 1203, the process proceeds to step S405.

In step S405, when the control unit 107 determines that the no-transmission period 903 exceeds the automatic one-touch registration information storage period 1203, the control unit 107 releases the one-touch registration number 1306 of the registration instruction information 1300 assigned to the destination 901, and deletes the registration instruction information 900 from the one-touch information storage unit 10051. In step S406, the control unit 107 writes the destination deleted from the one-touch information storage unit 10051 as log information to the storage unit 105.

The process from step S407 to step S411 is similar to that from step S204 to step S208 shown in FIG. 10, and an explanation thereof is omitted. Through the steps described above, the MFP 1000 performs the automatic deletion operation.

As described above, when the control unit 107 of the MFP 1000 determines that the no-transmission period 903 relative to the destination exceeds the automatic one-touch registration information storage period 1203 set in advance, the control unit 107 deletes the destination from the destination address book. Accordingly, it is possible to delete the destination with less frequent usage from the one-touch registration information without making an administrative operation of the one-touch registration information complicated.

As described above, in the embodiment, when the control unit 107 of the MFP 1000 determines that the no-transmission period 903 relative to the destination exceeds the automatic one-touch registration information storage period 1203 set in advance, the control unit 107 deletes the destination from the one-touch registration information. Accordingly, it is possible to delete the destination with less frequent usage from the one-touch registration information without making an administrative operation of the one-touch registration information complicated.

In the first and second embodiments described above, the electric mail address represents the destination. The present invention is not limited thereto, and a telephone number may represent the destination.

In the first and second embodiments described above, the multi function product is explained as the communication device of the present invention. The present invention is not limited thereto, and may be applicable to a device having a communication function such as a printing apparatus, a scanner, a copier, a facsimile, a telephone, and the like.

The disclosure of Japanese Patent Application No. 2009-070942, filed on Mar. 23, 2009, is incorporated in the application by reference.

While the invention has been explained with reference to the specific embodiments of the invention, the explanation is illustrative and the invention is limited only by the appended claims.

What is claimed is:

1. A communication device for sending data to a destination, comprising:
    a destination storage unit configured to register the destination;
    a registration information storage unit configured to store registration information indicating whether the destination is manually registered, said registration information being correlated to the destination;
    a condition input unit configured to input a registration condition to register the destination in the destination storage unit and a deletion condition to delete the destination from the destination storage unit;
    a condition storage unit configured to store the registration condition and the deletion condition;
    a destination registration unit configured to register the destination in the destination storage unit when information related to transmission of the data to the destination satisfies the registration condition, said destination registration unit being configured to manually register the destination in the destination storage unit according to an operation of a user; and
    a destination deletion unit configured to delete the destination from the destination storage unit when the information related to transmission of the data to the destination satisfies the deletion condition,
    wherein said destination deletion unit is configured to not delete the destination when the registration information indicates that the destination is manually registered.

2. The communication device according to claim 1, wherein said condition input unit is arranged to input the registration condition including a first threshold value representing a first transmission number relative to the destination and the deletion condition including a second threshold value indication a first period of time since a last transmission relative to the destination, said destination deletion unit being configured to delete the destination when a period of time since the last transmission relative to the destination exceeds the second threshold value.

3. The communication device according to claim 1, further including a display unit configured to display the destination as a first selection operation button so that the destination is selected when the first selection operation button is pushed.

4. The communication device according to claim 1, further comprising:
   a priority selection destination storage unit configured to register a priority destination capable of being selected prior to the destination;
   a priority selection registration instruction input unit configured to input a priority selection destination registration condition to register the priority destination in the priority selection destination storage unit and a priority selection destination deletion condition to delete the priority destination from the priority selection destination storage unit;
   a priority selection registration information storage unit configured to store the priority selection destination registration condition and the priority selection destination deletion condition;
   a priority selection destination registration unit configured to register the destination as the priority destination in the priority selection destination storage unit when information related to transmission of the data to the priority destination satisfies the priority selection destination registration condition; and
   a priority selection destination deletion unit configured to delete the priority destination from the priority selection destination storage unit when the information related to transmission of the data to the priority destination satisfies the priority selection destination deletion condition.

5. The communication device according to claim 4, wherein said priority selection registration instruction input unit is arranged to input the priority selection destination registration condition including a third threshold value representing a second transmission number relative to the priority destination and the priority selection destination deletion condition including a fourth threshold value indication a second period of time since a last transmission relative to the priority destination, said priority selection destination deletion unit being configured to delete the priority destination when a period of time since the last transmission relative to the priority destination exceeds the fourth threshold value.

6. The communication device according to claim 4, further including a priority selection display unit configured to display the priority destination as a second selection operation button prior to the destination so that the priority destination is selected when the second selection operation button is pushed.

7. The communication device according to claim 2, further comprising:
   a priority selection destination storage unit configured to register a priority destination capable of being selected prior to the destination;
   a priority selection registration instruction input unit configured to input a priority selection destination registration condition to register the priority destination in the priority selection destination storage unit and a priority selection destination deletion condition to delete the priority destination from the priority selection destination storage unit;
   a priority selection registration information storage unit configured to store the priority selection destination registration condition and the priority selection destination deletion condition;
   a priority selection destination registration unit configured to register the destination as the priority destination in the priority selection destination storage unit when information related to transmission of the data to the priority destination satisfies the priority selection destination registration condition; and
   a priority selection destination deletion unit configured to delete the priority destination from the priority selection destination storage unit when the information related to transmission of the data to the priority destination satisfies the priority selection destination deletion condition,
   wherein said priority selection registration instruction input unit is arranged to input the priority selection destination registration condition including a third threshold value representing a second transmission number relative to the priority destination and the priority selection destination deletion condition including a fourth threshold value indication a second period of time since a last transmission relative to the priority destination, said third threshold value being greater than the first threshold value, said priority selection destination deletion unit being configured to delete the priority destination when a period of time since the last transmission relative to the priority destination exceeds the fourth threshold value.

8. The communication device according to claim 4, wherein said destination registration unit is configured to validate or invalidate registration of the destination, and
   said priority selection destination registration unit is configured to validate or invalidate registration of the priority destination.

9. The communication device according to claim 1, further comprising a communication unit configured to transmit information related to transmission of the destination deleted with the destination deletion unit.

10. A communication device for sending data to a destination, comprising:
    a destination storage unit configured to register the destination;
    a registration information storage unit configured to store registration information indicating whether the destination is manually registered, said registration information being correlated to the destination;
    a condition input unit configured to input a registration condition to register the destination in the destination storage unit and a deletion condition to delete the destination from the destination storage unit;
    a condition storage unit configured to store the registration condition and the deletion condition;
    a destination registration unit configured to register the destination in the destination storage unit when information related to transmission of the data to the destination satisfies the registration condition, said destination registration unit being configured to manually register the destination in the destination storage unit according to an operation of a user;
    a destination deletion unit configured to delete the destination from the destination storage unit when the information related to transmission of the data to the destination satisfies the deletion condition;

a priority selection destination storage unit configured to register a priority destination capable of being selected prior to the destination;

a priority selection registration instruction input unit configured to input a priority selection destination registration condition to register the priority destination in the priority selection destination storage unit and a priority selection destination deletion condition to delete the priority destination from the priority selection destination storage unit;

a priority selection registration information storage unit configured to store the priority selection destination registration condition and the priority selection destination deletion condition;

a priority selection destination registration unit configured to register the destination as the priority destination in the priority selection destination storage unit when information related to transmission of the data to the priority destination satisfies the priority selection destination registration condition; and a priority selection destination deletion unit configured to delete the priority destination from the priority selection destination storage unit when the information related to transmission of the data to the priority destination satisfies the priority selection destination deletion condition, wherein said condition input unit is arranged to input the registration condition including a first threshold value representing a first transmission number relative to the destination and the deletion condition including a second threshold value indication a first period of time since a last transmission relative to the destination, said destination deletion unit being configured to delete the destination when a period of time since the last transmission relative to the destination exceeds the second threshold value, and said priority selection registration instruction input unit is arranged to input the priority selection destination registration condition including a third threshold value representing a second transmission number relative to the priority destination and the priority selection destination deletion condition including a fourth threshold value indication a second period of time since a last transmission relative to the priority destination, said third threshold value being greater than the first threshold value, said priority selection destination deletion unit being configured to delete the priority destination when a period of time since the last transmission relative to the priority destination exceeds the fourth threshold value.

11. A communication device for sending data to a destination, comprising:

a destination storage unit configured to register the destination;

a registration information storage unit configured to store registration information indicating whether the destination is manually registered, said registration information being correlated to the destination;

a condition input unit configured to input a registration condition to register the destination in the destination storage unit and a deletion condition to delete the destination from the destination storage unit;

a condition storage unit configured to store the registration condition and the deletion condition;

a destination registration unit configured to register the destination in the destination storage unit when information related to transmission of the data to the destination satisfies the registration condition, said destination registration unit being configured to manually register the destination in the destination storage unit according to an operation of a user;

a destination deletion unit configured to delete the destination from the destination storage unit when the information related to transmission of the data to the destination satisfies the deletion condition;

a priority selection destination storage unit configured to register a priority destination capable of being selected prior to the destination;

a priority selection registration instruction input unit configured to input a priority selection destination registration condition to register the priority destination in the priority selection destination storage unit and a priority selection destination deletion condition to delete the priority destination from the priority selection destination storage unit;

a priority selection registration information storage unit configured to store the priority selection destination registration condition and the priority selection destination deletion condition;

a priority selection destination registration unit configured to register the destination as the priority destination in the priority selection destination storage unit when information related to transmission of the data to the priority destination satisfies the priority selection destination registration condition; and a priority selection destination deletion unit configured to delete the priority destination from the priority selection destination storage unit when the information related to transmission of the data to the priority destination satisfies the priority selection destination deletion condition, wherein said destination registration unit is configured to validate or invalidate registration of the destination, and said priority selection destination registration unit is configured to validate or invalidate registration of the priority destination.

* * * * *